US012591257B2

(12) United States Patent
Hawkins et al.

(10) Patent No.: US 12,591,257 B2
(45) Date of Patent: Mar. 31, 2026

(54) PRESSURE REGULATORS WITH PIVOTABLE VALVE DISK ASSEMBLIES

(71) Applicant: Emerson Process Management Regulator Technologies, Inc., McKinney, TX (US)

(72) Inventors: Timothy Ryan Hawkins, McKinney, TX (US); Andrew Kislak Da Costa, Plano, TX (US); Ruben Longoria, Little Elm, TX (US); Justin Lane Masias, McKinney, TX (US); Douglas J. Scheffler, McKinney, TX (US); James Chester Hawkins, Allen, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 0 days.

(21) Appl. No.: 18/787,468

(22) Filed: Jul. 29, 2024

(65) Prior Publication Data

US 2026/0029807 A1    Jan. 29, 2026

(51) Int. Cl.
*G05D 16/06* (2006.01)

(52) U.S. Cl.
CPC .............................. *G05D 16/0688* (2013.01)

(58) Field of Classification Search
CPC ........... Y10T 137/7831; G05D 16/068; G05D 16/0688; F16K 1/34; F16K 1/36
USPC .............................................. 251/84, 85, 87
See application file for complete search history.

(56) References Cited

U.S. PATENT DOCUMENTS

| | | | | |
|---|---|---|---|---|
| 854,698 | A | * 5/1907 | Martell | F16J 15/38 |
| | | | | 251/86 |
| 2,717,003 | A | * 9/1955 | Bertram | F16K 1/44 |
| | | | | 251/282 |
| 2,840,336 | A | * 6/1958 | Suthann | F16K 1/46 |
| | | | | 251/86 |
| 3,009,678 | A | 11/1961 | Soderberg et al. | |

(Continued)

FOREIGN PATENT DOCUMENTS

GB        2137736 A  * 10/1984  ............... F16K 1/36

OTHER PUBLICATIONS

International Searching Authority, "International Search Report and Written Opinion," issued in connection with International Patent Application No. PCT/US2025/039194, mailed on Sep. 16, 2025, 13 pages.

*Primary Examiner* — Jessica Cahill
(74) *Attorney, Agent, or Firm* — Hanley, Flight & Zimmerman, LLC

(57) ABSTRACT

Pressure regulators with pivotable valve disk assemblies are disclosed. An example pressure regulator includes a valve body defining a fluid passageway between an inlet and an outlet, a seat positioned in the fluid passageway, a stem movable relative to the seat, and a disk assembly coupled to the stem, the disk assembly including a disk holder, an inner surface of the disk holder defining a cavity, a disk positioned in the cavity, the disk pivotable with respect to the disk holder to sealably engage the seat, and an alignment ring positioned between the inner surface and the disk, the alignment ring to provide a seal between the disk and the disk holder, the disk to compress the alignment ring when the disk pivots from a neutral position with respect to the disk holder, the alignment ring to bias the disk to the neutral position.

20 Claims, 5 Drawing Sheets

(56) References Cited

U.S. PATENT DOCUMENTS

| | | | | | |
|---|---|---|---|---|---|
| 3,601,360 | A | | 8/1971 | Scaramucci | |
| 3,812,882 | A | | 5/1974 | Taylor | |
| 4,172,585 | A | | 10/1979 | Rolfe | |
| 4,418,924 | A | * | 12/1983 | Mack | F16J 15/32 |
| | | | | | 277/910 |
| 4,911,403 | A | * | 3/1990 | Lockwood, Jr. | F16K 1/305 |
| | | | | | 251/210 |
| 5,090,438 | A | | 2/1992 | Nimberger | |
| 5,566,708 | A | * | 10/1996 | Hobbs, Jr. | F16L 19/02 |
| | | | | | 285/354 |
| 5,709,369 | A | * | 1/1998 | Hawkins | F16K 1/36 |
| | | | | | 251/86 |
| 5,911,402 | A | * | 6/1999 | Lavoie | A01K 63/006 |
| | | | | | 119/264 |
| 8,123,195 | B2 | | 2/2012 | Iwabuchi | |
| 9,200,716 | B2 | | 12/2015 | Mevius et al. | |
| 9,310,811 | B2 | | 4/2016 | Zhou | |
| 9,574,672 | B2 | | 2/2017 | Lin et al. | |
| 9,639,093 | B2 | | 5/2017 | Morgan | |
| 10,072,761 | B2 | | 9/2018 | Tuineag et al. | |
| 11,092,244 | B1 | | 8/2021 | Hu et al. | |
| 11,339,878 | B2 | | 5/2022 | Sonnier et al. | |
| 11,598,439 | B1 | | 3/2023 | Sonnier et al. | |
| 11,873,915 | B1 | * | 1/2024 | Addona | F16K 1/48 |
| 2009/0272924 | A1 | | 11/2009 | Wingett et al. | |
| 2012/0181464 | A1 | * | 7/2012 | Pfetzer | F16K 1/427 |
| | | | | | 251/333 |
| 2014/0083513 | A1 | * | 3/2014 | Zhou | F16K 31/165 |
| | | | | | 251/213 |
| 2014/0090719 | A1 | * | 4/2014 | Mevius | F16K 1/42 |
| | | | | | 137/505.18 |
| 2016/0201809 | A1 | * | 7/2016 | Varga | F16K 1/36 |
| | | | | | 251/84 |
| 2018/0031131 | A1 | | 2/2018 | Bregazzi et al. | |
| 2020/0116270 | A1 | * | 4/2020 | Groza | F16K 17/025 |
| 2021/0048020 | A1 | * | 2/2021 | Johnson | F04B 53/1027 |

* cited by examiner

PRESSURE REGULATORS WITH PIVOTABLE VALVE DISK ASSEMBLIES

FIELD OF THE DISCLOSURE

This disclosure relates generally to process control devices and, more particularly, to pressure regulators with pivotable valve disk assemblies.

BACKGROUND

Pressure regulators, sometimes referred to as fluid regulators, are commonly distributed throughout process control systems to control flow rates and/or pressures of various fluids (e.g., liquids, gases, etc.). Pressure regulators can be used to regulate the pressure of a fluid to a substantially constant value. For example, a pressure regulator typically has an inlet that receives a supply of process fluid at a relatively high pressure and reduces the pressure to a relatively lower and/or substantially constant pressure at an outlet.

SUMMARY

An example pressure regulator disclosed herein includes a valve body defining a fluid passageway between an inlet and an outlet, a seat positioned in the fluid passageway, a stem movable relative to the seat, and a disk assembly coupled to the stem, the disk assembly including a disk holder, an inner surface of the disk holder defining a cavity, a disk positioned in the cavity, the disk pivotable with respect to the disk holder to sealably engage the seat, and an alignment ring positioned between the inner surface and the disk, the alignment ring to provide a seal between the disk and the disk holder, the disk to compress the alignment ring when the disk pivots from a neutral position with respect to the disk holder, the alignment ring to bias the disk to the neutral position.

A first example valve disk assembly disclosed herein includes a disk holder, an inner surface of the disk holder defining a cavity, a disk positioned in the cavity, the disk pivotable with respect to the disk holder, and an alignment ring positioned between the inner surface and the disk, the alignment ring to provide a seal between the disk and the disk holder, the disk to compress the alignment ring when the disk pivots from a neutral position with respect to the disk holder, the alignment ring to bias the disk to the neutral position.

A second example valve disk assembly disclosed herein includes a disk holder, a disk positioned in the disk holder, the disk pivotable from a neutral position with respect to the disk holder, and an O-ring positioned between the disk and the disk holder, the O-ring to bias the disk to the neutral position.

Figure 1:
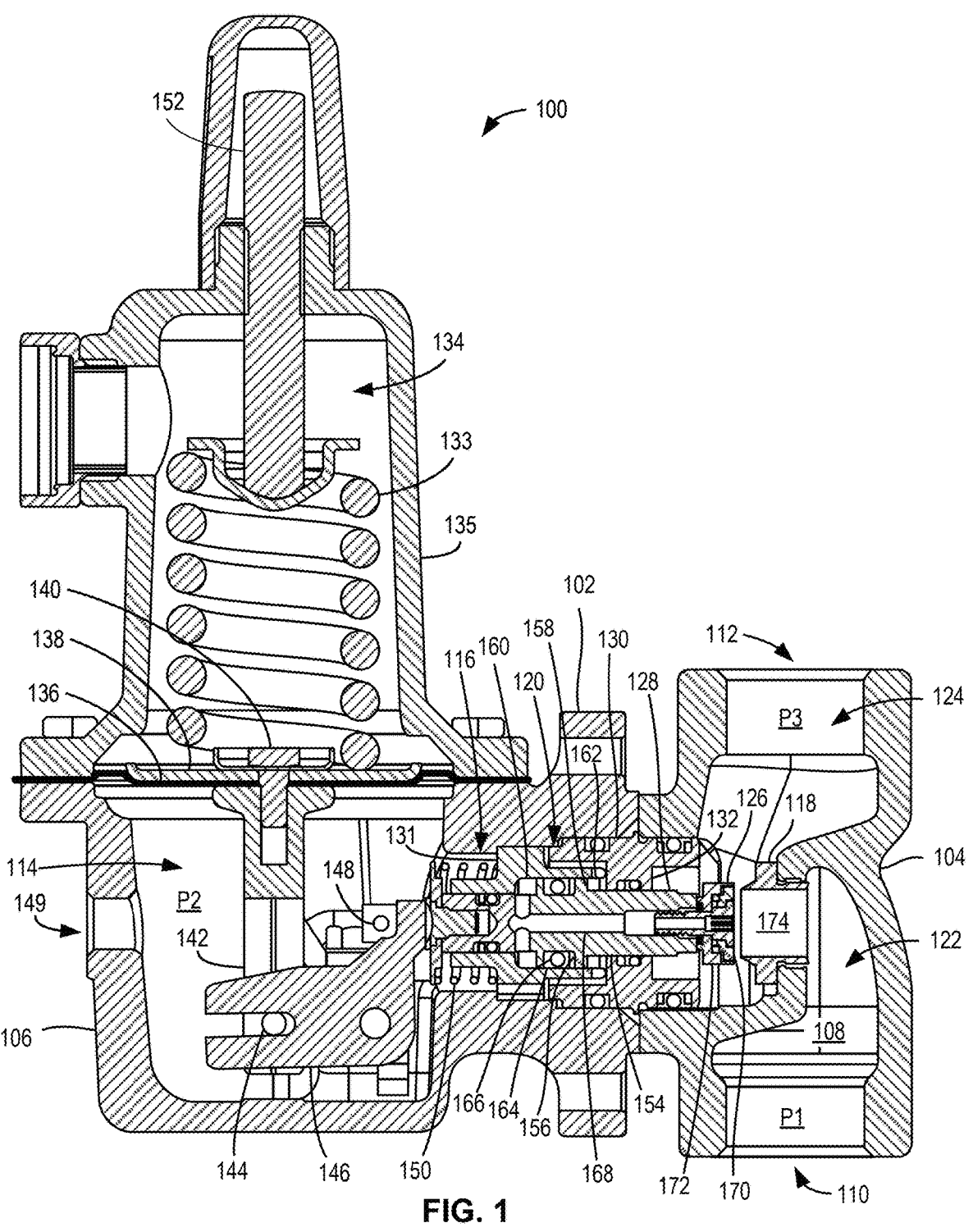
FIG. 1 is a cross-sectional view of an example pressure regulator including an example valve disk assembly constructed in accordance with the teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In general, pressure regulators (e.g., fluid regulators) modulate, based on a sensed downstream pressure, flow of fluid through a system to maintain process system pressures within acceptable and/or constant pressure threshold(s). Typically, pressure regulators include a stem assembly having a disk assembly (e.g., a plug) coupled to a stem. The stem is moveable (e.g., relative to a regulator body) to move the disk assembly relative to a seat to control the flow of fluid through a fluid passageway defined between an inlet and an outlet of the pressure regulator. Further, pressure regulators commonly include a diaphragm operatively coupled to the stem assembly. The diaphragm separates a control chamber from a pressure sense chamber of the pressure regulator, where the pressure sense chamber is fluidly coupled to and receives fluid from a downstream location. The diaphragm moves (e.g., deflects) based on a difference between a first pressure in the pressure sense chamber (e.g., corresponding to a pressure of the fluid from the downstream location) and a second pressure in the control chamber (e.g., set via a spring). Additionally, the stem assembly is disposed between the pressure sense chamber and the fluid passageway. In some cases, movement of the diaphragm causes the stem assembly to move away from and/or toward the seat to allow and/or restrict the flow of fluid through the fluid passageway and, thus, to control the flow of fluid between the inlet and the outlet of the pressure regulator.

In some instances, manufacturing tolerances may result in one or more components of the pressure regulator being offset and/or otherwise misaligned (e.g., relative to other component(s) of the pressure regulator). For instance, a first longitudinal axis of the stem may be misaligned and/or offset from a second longitudinal axis of the seat. In some instances, as a result of the offset and/or misalignment, the disk assembly does not sealably engage the seat when the stem assembly is in a closed position (e.g., when the disk assembly contacts the seat to restrict fluid flow through the fluid passageway). Accordingly, some fluid may pass from the downstream location into a balance passage of the stem when the stem assembly is in the closed position, which may be undesirable for some applications. Further, misalignment between the disk assembly and an orifice of the seat may result in an undesirable build-up of pressure when the stem assembly is moved to the closed position. In some instances, because the disk assembly is rigidly coupled to the stem, the stem may tilt to compensate for the misalignment, which may result in damage to the stem and/or the regulator body. Additionally, as a result of such misalignment, increased force on the stem may be necessitated to press the disk assembly against the orifice in the closed position.

Disclosed herein are example pressure regulators with example valve disk assemblies (e.g., pivotable valve disk assemblies, self-aligning and sealing valve disk assemblies) that address the drawbacks noted above. In particular, example valve disk assemblies disclosed herein enable pivoting and/or rotation of an example disk of the valve disk assembly (e.g., relative to an example disk holder of the valve disk assembly). As a result, examples disclosed herein enable the disk to sealably engage a seat of a pressure regulator by compensating for (e.g., reducing the effects of) possible misalignment between the seat and a stem rigidly coupled to the disk holder. Further, by enabling rotation and/or pivoting of the disk, examples disclosed herein reduce a possibility of damage (e.g., to the stem and/or to a regulator body of the pressure regulator) by reducing tilt of the stem and/or by reducing pressure build-up (e.g., lock up pressure) when the valve disk assembly engages the seat. Additionally, examples disclosed herein provide an example through-hole (e.g., a cavity) in the valve disk assembly to fluidly couple an orifice of the seat and an example balance passage of the stem. In some such examples, a portion of the through-hole defines an example hex-shaped feature (e.g., an angled feature) that can facilitate installation and/or removal of the valve disk assembly (and/or one or more parts thereof) to and/or from the stem. As a result, examples disclosed herein can improve servicing (e.g., repair and/or replacement) of the pressure regulator.

Examples disclosed herein include an example alignment ring (e.g., an O-ring, an alignment and sealing mechanism) positioned between the disk and the disk holder. In some examples, the disk compresses a portion of the alignment ring when the disk pivots from a neutral position (e.g., with respect to the disk holder), and the compressed alignment ring biases the disk to the neutral position. As a result, the disk can be returned to the neutral position when alignment between the disk and the seat is restored and/or when the disk moves away from (e.g., is spaced apart from) the seat. Further, the alignment ring provides a seal between the disk and the disk holder to reduce and/or prevent leakage of fluid between an outer surface and an orifice of the seat. In some examples, the disk holder includes protruding surface(s) and/or serrated surface(s) to contact the alignment ring to improve sealing performance of the alignment ring. In some examples, the alignment ring can be integrally formed in the disk or the disk holder to reduce part costs and/or manufacturing complexity of the valve disk assembly.

FIG. 1 is a cross-sectional view of an example pressure regulator 100 constructed in accordance with the teachings of this disclosure. In the illustrated example, the pressure regulator 100 includes an example device body 102 (e.g., a casing, a housing, etc.). In this example, the device body 102 includes an example regulator body 104 (sometimes referred to as a valve body or housing) and an example casing 106 that are coupled together (e.g., via one or more bolts). However, in other examples, the device body 102 can include more or fewer bodies or housings. In the illustrated example, the regulator body 104 of the device body 102 defines a fluid passageway 108 between an example inlet 110 and an example outlet 112. In some examples, an upstream pipe can be coupled to the regulator body 104 at the inlet 110 to provide fluid to the fluid passageway 108. In some examples, a downstream pipe can be coupled to the regulator body 104 at the outlet 112 to provide reduced pressure fluid to a downstream location. In the illustrated example, the casing 106 defines an example pressure sense chamber 114. Further, the device body 102 defines an example channel 116 (e.g., an opening, a bore, etc.) between the fluid passageway 108 and the pressure sense chamber 114.

In the illustrated example, the pressure regulator 100 includes an example seat 118 in the fluid passageway 108. The pressure regulator 100 also includes an example stem assembly 120. The stem assembly 120 controls the flow of fluid through the seat 118 and, thus, between the inlet 110 and the outlet 112. The seat 118 divides the fluid passageway 108 into an upstream portion 122 (upstream of the seat 118) and a downstream portion 124 (downstream of the seat 118).

In the illustrated example, the stem assembly 120 includes an example valve disk assembly (e.g., a self-aligning disk assembly, a pivotable disk assembly) 126 constructed in accordance with teachings of this disclosure. In this example, the stem assembly 120 further includes an example stem 128 and an example stem guide 130, where the valve disk assembly 126 is coupled (e.g., rigidly coupled) to the stem 128. The stem 128 is moveable (e.g., slidable) relative to the stem guide 130 to move the valve disk assembly 126 toward or away from the seat 118, thereby controlling the flow of fluid through the seat 118. The valve disk assembly 126 can be moved between an open position (shown in FIG. 1) and a closed position (shown in FIGS. 2 and/or 3). In the open position, as shown in FIG. 1, the valve disk assembly 126 is spaced apart from the seat 118, which allows fluid to flow from the inlet 110 to the outlet 112. In the closed position, the valve disk assembly 126 is sealably engaged with the seat 118, which prevents and/or restricts fluid flow from the inlet 110 to the outlet 112. Therefore, the seat 118 and the valve disk assembly 126 form a valve. In some examples, the pressure regulator 100 can move the valve disk assembly 126 between the open and closed positions to regulate the pressure of the fluid downstream.

In the illustrated example of FIG. 1, the stem guide 130 is disposed in the channel 116 between the pressure sense chamber 114 and the fluid passageway 108. The stem guide 130 is sealed relative to the device body 102 to fluidly isolate the fluid in the fluid passageway 108 and fluid in the pressure sense chamber 114. The stem guide 130 has a first side 131 and a second side 132 opposite the first side 131. The first side 131 faces the pressure sense chamber 114 and is exposed to the pressure sense chamber 114. The second side 132 faces the fluid passageway 108 and is exposed to the fluid passageway 108.

In the example of FIG. 1, the casing 106 is coupled to an example spring casing 135 including an example control spring 133. The control spring 133 is used to control or set the pressure at which the pressure regulator 100 opens and closes. The control spring 133 is disposed in an example control chamber 134 in the spring casing 135. In some examples, the control chamber 134 is open to the atmosphere. In other examples, the control chamber 134 may be pressurized with a fluid. In the illustrated example, the pressure regulator 100 includes an example diaphragm 136 that separates the control chamber 134 and the pressure sense chamber 114. The pressure regulator 100 further includes an example diaphragm plate 138 that is coupled to the diaphragm 136 via an example diaphragm cap screw 140. In the illustrated example, the control spring 133 is engaged with the diaphragm plate 138, which biases the diaphragm plate 138 and the diaphragm 136 toward the pressure sense chamber 114 (downward in FIG. 1). The diaphragm plate 138 is coupled to an example pusher post 142 (e.g., via the diaphragm cap screw 140). The pusher post 142 includes an example drive pin 144 that cooperates with an example lever 146. The lever 146 is pivotably coupled to the casing 106. The lever 146 is coupled to an example stem pin 148 that is coupled to the stem 128. As the pusher post 142 moves up and down, the pusher post 142 rotates the lever 146, which moves the stem 128 linearly in the stem guide 130 (left and right in FIG. 1).

The pressure regulator 100 receives, at the inlet 110, fluid at a first example pressure (e.g., P1). In some examples, the pressure regulator 100 restricts and/or reduces flow of the fluid to the outlet 112 based on a pressure of fluid at a downstream location, where the fluid at the downstream location is at a second example pressure (e.g., P2). For example, when the second pressure meets or exceeds a threshold pressure (e.g., a set pressure, a trigger pressure), the pressure regulator 100 closes the fluid passageway 108 to regulate the pressure of the fluid at the downstream location. In the illustrated example, the downstream location is fluidly coupled to the pressure sense chamber 114, such that the pressure sense chamber 114 is at the second pressure. In this example, the pressure regulator 100 is an external sense pressure regulator, where the pressure sense chamber 114 is referenced to an external pressure. In such examples, the pressure at the downstream location is fluidly coupled to the pressure sense chamber 114 via a fluid line (e.g., a hose, a pipe, a tube, etc.) coupled to and/or positioned in an example opening (e.g., a fluid passage) 149 in the casing 106. In some examples, the pressure regulator 100 is an internal sense pressure regulator, where the pressure sense chamber 114 is referenced to the pressure of the fluid in the downstream portion 124. In such examples, the pressure regulator 100 can include one or more passages to fluidly couple the downstream portion 124 of the fluid passageway 108 and the pressure sense chamber 114.

When the second pressure in the pressure sense chamber 114 satisfies (e.g., is at or above) the threshold pressure, the second pressure overcomes the spring force of the control spring 133 and forces the diaphragm 136 upward in FIG. 1. As the diaphragm 136 and the diaphragm plate 138 move upward, the pusher post 142 rotates the lever 146 in a first direction (e.g., clockwise in FIG. 1). The lever 146 pushes the stem 128 to the right in FIG. 1, until the valve disk assembly 126 engages the seat 118 to close and/or seal off the fluid passageway 108 and, thus, reduce the pressure of the fluid at the downstream location. When the second pressure of the fluid in the pressure sense chamber 114 does not satisfy (e.g., is less than) the threshold pressure, the spring force of the control spring 133 overcomes the second pressure and moves the diaphragm 136 and the diaphragm plate 138 downward in FIG. 1. As a result, the pusher post 142 moves downward in FIG. 1 and rotates the lever 146 in a second direction (e.g., counterclockwise in FIG. 1). In some examples, the pressure regulator 100 includes a return spring 150 to bias the stem 128 back to the left in FIG. 1, such that the valve disk assembly 126 moves away from the seat 118. Thus, the threshold pressure is based (at least partially) on the spring force from the control spring 133. In some examples, the spring force can be increased or decreased to change the threshold pressure to a desired pressure level. For example, an adjustment screw 152 can be adjusted to increase or decrease the compression of the control spring 133 and, thus, change the force the control spring 133 exerts on the diaphragm 136.

In the illustrated example, the pressure of the fluid in the downstream portion 124 of the fluid passageway 108 is at a third example pressure (e.g., P3). In some examples, such as when the valve disk assembly 126 is throttling (e.g., actively moving between the open and closed positions), the third pressure may be substantially lower than the first pressure. In other examples, such as when the valve disk assembly 126 is held in the open position for a period of time, the third pressure may be the same (or substantially the same) as the first pressure (e.g., there may be a relatively small pressure drop across the seat 118). In some examples, the second pressure is substantially the same as the third pressure. However, in other examples, the second pressure can be different from the third pressure.

Because the pressures (e.g., P1, P2, and P3) may be different, the example pressure regulator 100 balances the stem 128 to reduce and/or eliminate the effect of the pressure differential on the stem 128 and the valve disk assembly 126. In the illustrated example, the stem 128 has an example stem body 154 and an example flange 156 extending radially from the stem body 154. Further, the stem guide 130 defines an example balance chamber 158. The stem 128 extends through the stem guide 130, such that the flange 156 is disposed in the balance chamber 158. In this example, the flange 156 divides the balance chamber 158 into a first balance chamber portion 160 and a second balance chamber portion 162. In particular, the flange 156 fluidly separates the first and second balance chamber portions 160, 162. In the illustrated example, the flange 156 defines an example seal gland 164. The pressure regulator 100 further includes a seal 166 positioned in the seal gland 164 and engaged with an inner surface of the stem guide 130 forming the balance chamber 158. In some examples, the seal 166 fluidly isolates the first and second balance chamber portions 160, 162.

In the illustrated example, an example balance passage (e.g., a balance port, a pressure registration port) 168 is defined through the valve disk assembly 126 and through a portion of the stem 128 that extends to the first balance chamber portion 160. In particular, a portion of the balance passage 168 extends longitudinally through the stem 128, and another portion of the balance passage 168 extends in a transverse direction (e.g., upward or downward in FIG. 1) to an outer surface of the stem 128. As such, when the valve disk assembly 126 is in the open position, as shown in FIG. 1, the balance passage 168 fluidly couples the downstream portion 124 of the fluid passageway 108 and the first balance chamber portion 160. Therefore, the fluid in the first balance chamber portion 160 is at the third pressure (which may be the same as or similar to the first pressure) when the valve disk assembly 126 is in the open position. Conversely, when the valve disk assembly 126 is in the closed position, the balance passage 168 fluidly couples the upstream portion 122 of the fluid passageway 108 and the first balance chamber portion 160. As a result, the fluid in the first balance chamber portion 160 is at the first pressure when the valve disk assembly 126 is in the closed position. In some examples, the balance passage 168 can be formed by one or more openings or channels through one or more other structures.

In some examples, one or more components of the pressure regulator 100 (e.g., the stem 128 and the seat 118, the valve disk assembly 126 and the seat 118, etc.) may be misaligned and/or offset from one another as a result of manufacturing tolerances, wear of one or more component(s), etc. In the illustrated example of FIG. 1, the valve disk assembly 126 includes an example disk 170 that is pivotable and/or rotatable within an example disk holder 172 of the valve disk assembly 126. In some examples, the disk 170 can pivot as a result of contact with the seat 118 when the valve disk assembly 126 moves to the closed position. For example, the disk 170 can pivot to account for misalignment between the seat 118 and the valve disk assembly 126 and/or the stem 128. As a result, the disk 170 can sealably engage the seat 118 and, thus, seal off an orifice 174 of the seat 118 from the downstream portion 124 of the fluid passageway 108. In some examples, the disk 170 is constructed from and/or includes nylon. In some examples, one or more different materials (e.g., a metal, a polymer, etc.) may be used for and/or included in the disk 170.

Figure 2:
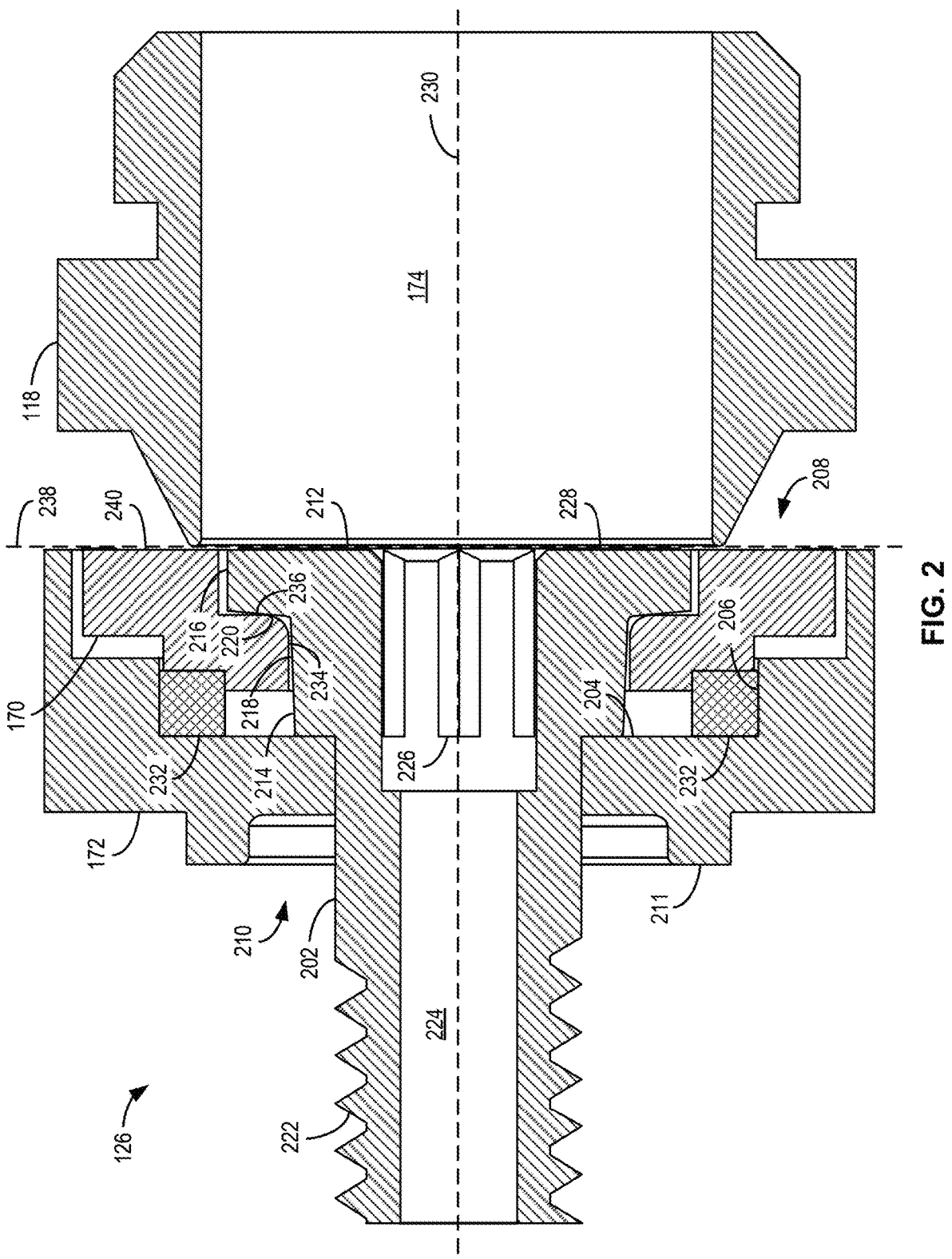
FIG. 2 is a cross-sectional view of the example valve disk assembly of FIG. 1 in a neutral position.

FIG. 2 is a cross-sectional view of the example valve disk assembly 126 of FIG. 1. In the illustrated example of FIG. 2, the valve disk assembly 126 is shown in a closed position in which the disk 170 is sealably engaged to the seat 118. The valve disk assembly 126 of FIG. 2 includes the disk holder 172, the disk 170, and an example retainer 202. In this example, a first example inner surface (e.g., an annular surface) 204 and a second example inner surface (e.g., a sidewall surface) 206 of the disk holder 172 define an example cavity 208 in which the disk 170 is positioned and/or disposed. In FIG. 2, the second inner surface 206 is angled with respect to the first inner surface 204, such that the second inner surface 206 is substantially perpendicular to the first inner surface 204 (e.g., an angle between the first and second inner surfaces 204, 206 is approximately 90 degrees). In some examples, the angle between the first and second inner surfaces 204, 206 may be different (e.g., less than or greater than 90 degrees). Further, the disk holder 172 includes an example aperture 210 extending between the first inner surface 204 and a first example outer surface 211 of the disk holder 172. In this example, the retainer 202 is positioned in the aperture 210. While the retainer 202 and the disk holder 172 are separate in this example, the retainer 202 can be integral to the disk holder 172 in some examples, such that the retainer 202 and the disk holder 172 form a unitary (e.g., single) part.

In the illustrated example of FIG. 2, the retainer 202 includes an example head (e.g., a retaining head) 212 extending into and/or positioned in the cavity 208. The head 212 includes an inner portion 214 and a flanged portion 216 extending (e.g., radially extending) from the inner portion 214. In some examples, a first diameter of the inner portion 214 is greater than a second diameter of the aperture 210, such that the head 212 is prevented from passing through the aperture 210. Further, a third diameter of the flanged portion 216 is greater than the first diameter of the inner portion 214. In this example, a first retainer surface 218 of the inner portion 214 is angled relative to a second retainer surface 220 of the flanged portion 216, such that the first and second retainer surfaces 218, 220 form and/or define a first angled surface of the retainer 202. In this example, the first angled surface is a concave surface, where a first angle between the first and second retainer surfaces 218, 220 is greater than or equal to 90 degrees (e.g., 91 degrees, 92 degrees, etc.).

In the illustrated example, the retainer 202 includes an example threaded portion 222 extending from the first outer surface 211 of the disk holder 172. In some examples, the threaded portion 222 can be inserted into a corresponding threaded opening of the stem 128 of FIG. 1 to couple (e.g., removably couple) the valve disk assembly 126 to the stem 128. Further, in the example of FIG. 2, the retainer 202 includes an example through-hole 224 extending longitudinally through the retainer 202. In some examples, the through-hole 224 forms and/or defines a portion of the balance passage 168 of the stem 128 of FIG. 1. For example, when the valve disk assembly 126 is in the closed position of FIG. 2, fluid from the orifice 174 can enter the through-hole 224 and, thus, the balance passage 168 to flow to the first balance chamber portion 160 of FIG. 1.

In the example of FIG. 2, a portion of the through-hole 224 includes an example hex-shaped feature (e.g., an angled feature) 226 proximate a third retainer surface 228 of the retainer 202. In some examples, the hex-shaped feature 226 can be used to facilitate installation and/or removal of the valve disk assembly 126 to and/or from the stem 128 of FIG. 1. For example, a tool (e.g., a hand tool and/or a powered tool) corresponding to the hex-shaped feature 226 can be inserted into the hex-shaped feature 226, such that rotation of the tool causes corresponding rotation of the retainer 202 and/or the valve disk assembly 126 about a longitudinal axis 230 of the retainer 202 and/or the disk holder 172. In some such examples, the rotation of the retainer 202 about the longitudinal axis 230 causes the threaded portion 222 of the retainer 202 to be threaded into and/or unthreaded from the stem 128 of FIG. 1. In some examples, unthreading of the threaded portion 222 from the stem 128 can result in the retainer 202 being removed from both the stem 128 and the disk holder 172. In some examples, unthreading of the threaded portion 222 from the stem 128 results in removal of the disk holder 172 from the stem 128. In some examples, by facilitating installation and/or removal of the retainer 202 and/or the valve disk assembly 126, the hex-shaped feature 226 facilitates repair, replacement, and/or other maintenance activities associated with the valve disk assembly 126 and/or the pressure regulator 100 of FIG. 1. In the illustrated example of FIG. 2, the hex-shaped feature 226 corresponds to a recess having a hexagonal shape. In some examples, additionally or alternatively, the retainer 202 can include one or more different angled features and/or recesses (e.g., in addition to or instead of the hex-shaped feature 226) in the third retainer surface 228 and/or in the through-hole 224 to facilitate installation and/or removal of the retainer 202 and/or the valve disk assembly 126.

In the illustrated example of FIG. 2, the disk 170 extends circumferentially around the retainer 202 (e.g., around the head 212 of the retainer 202). In some examples, the disk 170 includes a first disk surface 234 and a second disk surface 236, where the first and second disk surfaces 234, 236 form and/or define a second angled surface (e.g., a convex surface) of the disk 170. In this example, the first disk surface 234 is substantially perpendicular to the second disk surface 236 (e.g., a second angle between the first and second disk surfaces 234, 236 is approximately 90 degrees). In some examples, the second angle between the first and second disk surfaces 234, 236 may be different (e.g., less than or greater than 90 degrees).

In some examples, the disk 170 is pivotable and/or rotatable about the head 212 of the retainer 202. For example, the second angled surface (e.g., corresponding to the first and second disk surfaces 234, 236) of the disk 170 is complementary to the first angled surface (e.g., corresponding to the first and second retainer surfaces 218, 220) of the retainer 202 to enable and/or facilitate pivoting of the disk 170 relative to the head 212. In some examples, the disk 170 can rotate relative to the head 212 and/or the disk holder 172 about the longitudinal axis 230. Additionally, the disk 170 can pivot about the head 212 relative to an example pivot plane 238, where the pivot plate 238 is substantially aligned with the third retainer surface 228 of the retainer 202. In the example of FIG. 2, when the disk 170 pivots from the pivot plane 238, the second disk surface 236 of the disk 170 contacts and/or pivots relative to the second retainer surface 220 of the retainer 202. In some examples, the first disk surface 234 contacts (e.g., engages) the first retainer surface 218 of the retainer 202 when the disk 170 pivots from the pivot plane 238 by an example threshold pivot angle. In such examples, the first retainer surface 218 restricts and/or prevents pivoting of the disk 170 by more than the threshold pivot angle with respect to the pivot plane 238.

In the illustrated example of FIG. 2, the valve disk assembly 126 includes an example alignment ring (e.g., an alignment and sealing mechanism, an O-ring) 232 positioned in the cavity 208 between the disk 170 and the disk holder 172. In this example, the alignment ring 232 contacts (e.g., sealably engages) the first and second inner surfaces 204, 206 of the disk holder 172, and further contacts (e.g., sealably engages) the disk 170. As a result, the alignment ring 232 provides a seal between the disk 170 and the disk holder 172 (e.g., between the disk 170 and the first and second inner surfaces 204, 206 of the disk holder 172). In some examples, one or more adhesive layers (not shown) can be coupled between the alignment ring 232 and the disk 170, between the alignment ring 232 and the first inner surface 204, and/or between the alignment ring 232 and the second inner surface 206. In some examples, the alignment ring 232 can be welded to and/or integrally formed with the disk holder 172 (e.g., such that the alignment ring 232 and the disk holder 172 form a single and/or unitary part). Alternatively, the alignment ring 232 can be integrally formed with the disk 170 (e.g., such that the alignment ring 232 and the disk 170 form a single and/or unitary part). In this example, the alignment ring 232 has a square cross-sectional shape. In some examples, the alignment ring 232 can have a different cross-sectional shape (e.g., circular, rectangular, hexagonal, etc.).

In the illustrated example of FIG. 2, the disk 170 is shown in a neutral position (e.g., a starting position, an undeflected position, an unpivoted position) in which a third disk surface 240 of the disk 170 is substantially flush with the third retainer surface 228 of the retainer 202 and/or with the pivot plane 238. In some examples, when the disk 170 contacts the seat 118 (e.g., when the valve disk assembly 126 moves to the closed position of FIG. 2), the disk 170 pivots from the neutral position of FIG. 2 to account for misalignment between the valve disk assembly 126 and the seat 118 and, thus, to sealably engage with the seat 118. In some examples, when the disk 170 pivots from the neutral position (e.g., such that the third disk surface 240 is angled with respect to the pivot plane 238), the disk 170 compresses a portion of the alignment ring 232. In FIG. 2, the alignment ring 232 is constructed from an elastomeric material (e.g., rubber, polymer, etc.) that can elastically deform as a result of the compression by the disk 170. In some examples, when the disk 170 compresses a portion of the alignment ring 232, the compressed and/or deformed portion of the alignment ring 232 opposes the pivoting motion of the disk 170 and/or otherwise biases the disk 170 to the neutral position. As such, when the valve disk assembly 126 moves away from the seat 118 (e.g., from the closed position of FIG. 2 to the open position of FIG. 1), the alignment ring 232 causes the disk 170 to return to the neutral position of FIG. 2 (e.g., to re-align the third disk surface 240 of the disk 170 with the pivot plane 238).

Figure 3:
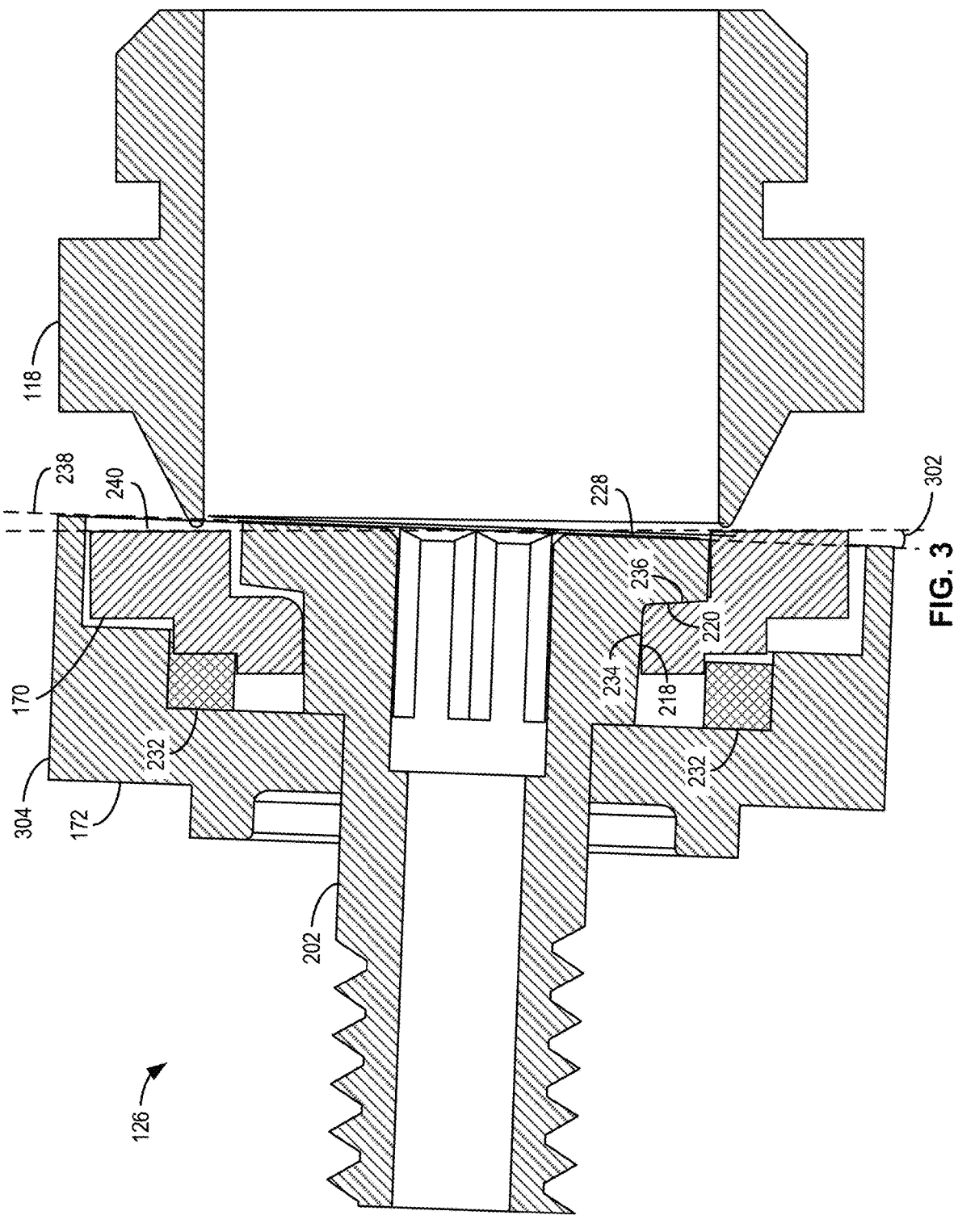
FIG. 3 is a cross-sectional view of the example valve disk assembly of FIGS. 1 and/or 2 in a deflected position.

FIG. 3 is a cross-sectional view of the example valve disk assembly 126 of FIGS. 1 and/or 2, with the disk 170 in a deflected position (e.g., a pivoted position). In particular, in the illustrated example of FIG. 3, the valve disk assembly 126 is in the closed position, and the disk 170 is pivoted from the pivot plane 238 by an example pivot angle 302 (e.g., the third disk surface 240 of the disk 170 is offset from the pivot plane 238 and/or from the third retainer surface 228 of the retainer 202 by the pivot angle 302).

In some examples, the disk 170 can pivot by up to an example threshold pivot angle from the pivot plane 238 (e.g., the pivot angle 302 can be less than or equal to the threshold pivot angle). For example, when the disk 170 pivots from the pivot plane 238 by the threshold pivot angle, the second angled surface (e.g., the first and second disk surfaces 234, 236) of the disk 170 engages the first angled surface (e.g., the first and second retainer surfaces 218, 220) of the retainer 202 such that the disk 170 is prevented and/or restricted from pivoting further from the pivot plane 238. Additionally or alternatively, the alignment ring 232 restricts and/or prevents pivoting of the disk 170 from the pivot plane 238 by more than the threshold pivot angle (e.g., when the alignment ring 232 is compressed by a threshold amount). In this example, the threshold pivot angle is approximately 2 degrees. In some examples, the threshold pivot angle can be different (e.g., 1 degree, 1.5 degrees, 3 degrees, etc.). In some examples, the threshold pivot angle can be adjusted by adjusting (e.g., increasing or decreasing) a first angle of the first angled surface (e.g., between the first and second retainer surfaces 218, 220), a second angle of the second angled surface (e.g., between the first and second disk surfaces 234, 236), a stiffness of the alignment ring 232, etc.

In some examples, in addition to or instead of the alignment ring 232, the valve disk assembly 126 can include one or more sealing rings (e.g., O-rings) between the disk 170 and the disk holder 172 to provide a seal therebetween, and/or can include one or more springs (e.g., coil spring(s), wave spring(s)) operatively coupled between the disk and the disk holder 172 to bias the disk 170 to the neutral position of FIG. 2. In other words, the sealing and alignment functionalities of the alignment ring 232 may be implemented using separate devices and/or components (e.g., O-ring(s) and/or spring(s)) in some examples. Further, in some examples, an outer surface 304 of the disk holder 172 can be crimped (e.g., an outer diameter of the disk holder 172 can be reduced) to facilitate retention of the seat 118 with respect to the valve disk assembly 126 (e.g., when the valve disk assembly 126 is in the closed position of FIGS. 2 and/or 3).

Figure 4:
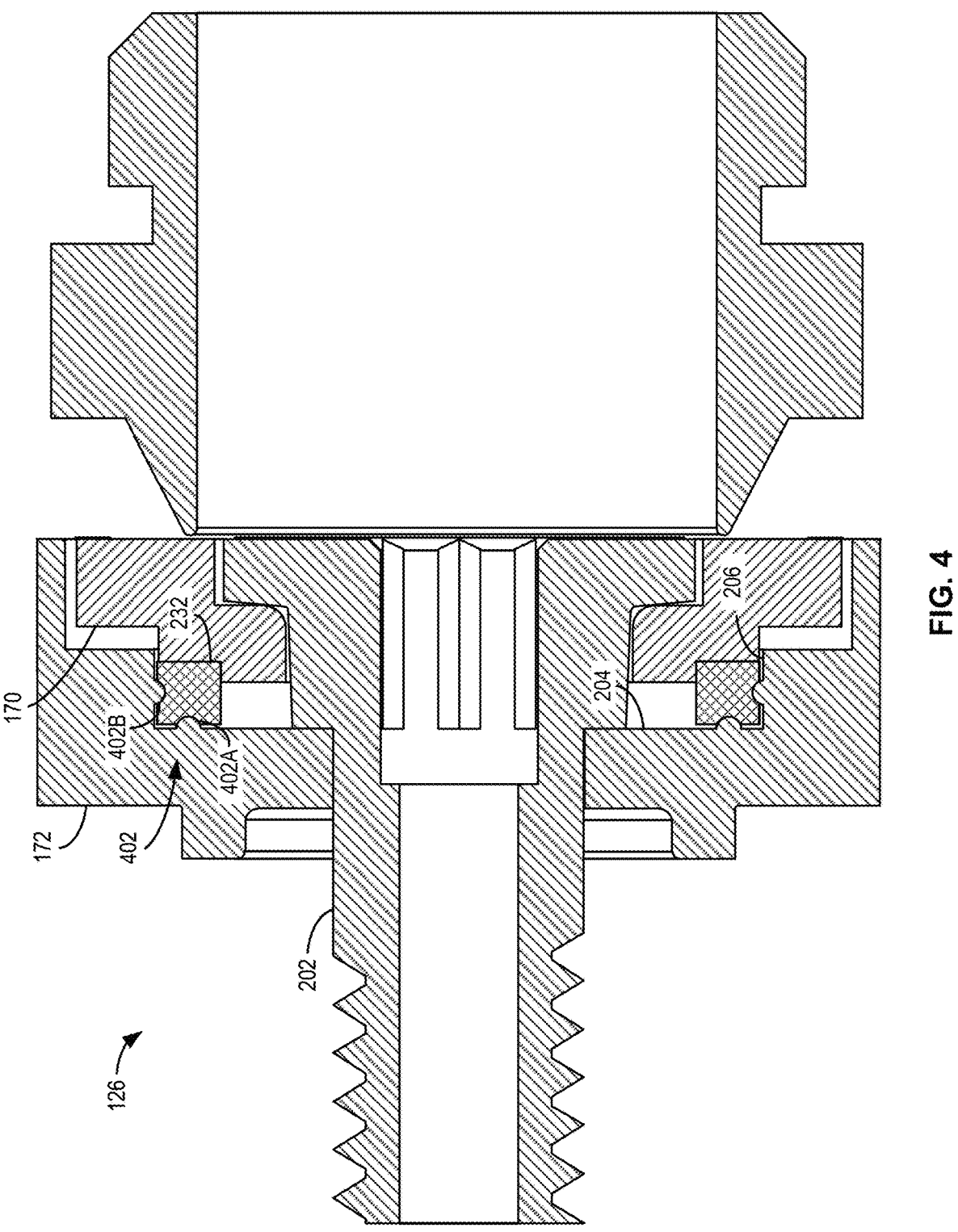
FIG. 4 is a cross-sectional view of the example valve disk assembly of FIGS. 1, 2, and/or 3 including example protrusions.

FIG. 4 illustrates the example valve disk assembly 126 of FIGS. 1, 2, and/or 3 including example protrusions (e.g., protruding surfaces, bumps, nubs) 402. For example, in FIG. 4, the disk holder 172 includes one or more first example protrusions 402A extending from the first inner surface 204 of the disk holder 172, and one or more second example protrusions 402B extending from the second inner surface 206 of the disk holder 172. In some examples, the first protrusion(s) 402A and/or the second protrusion(s) 402B sealably engage the alignment ring 232 to improve sealing performance of the alignment ring 232 (e.g., at an interface between the alignment ring 232 and the disk holder 172).

In the illustrated example of FIG. 4, the protrusions 402 have a semicircular cross-sectional shape. In some examples, a cross-sectional shape of one(s) of the protrusions 402 may be different (e.g., triangular, rectangular, etc.). Further, in some examples, the disk holder 172 can include one or more additional protrusions (e.g., in addition to the protrusions 402 shown in FIG. 4), and/or one(s) of the protrusions 402 may be omitted. While the protrusions 402 extend from the respective inner surfaces 204, 206 of the disk holder 172 in this example, one or more of the protrusions 402 can additionally or alternatively be part of the alignment ring 232 in some examples (e.g., one(s) of the protrusions 402 may extend from the alignment ring 232 in addition to or instead of the disk holder 172). In some examples, the protrusions 402 correspond to rings extending from the respective inner surfaces 204, 206 and encircling (e.g., extending continuously and/or circumferentially about) the retainer 202. In some examples, the protrusions 402 correspond to multiple (e.g., disparate) protruding surfaces (e.g., bumps, nubs) positioned on the respective inner surfaces 204, 206 of the disk holder 172 and/or spaced about the circumference of the retainer 202.

Figure 5:
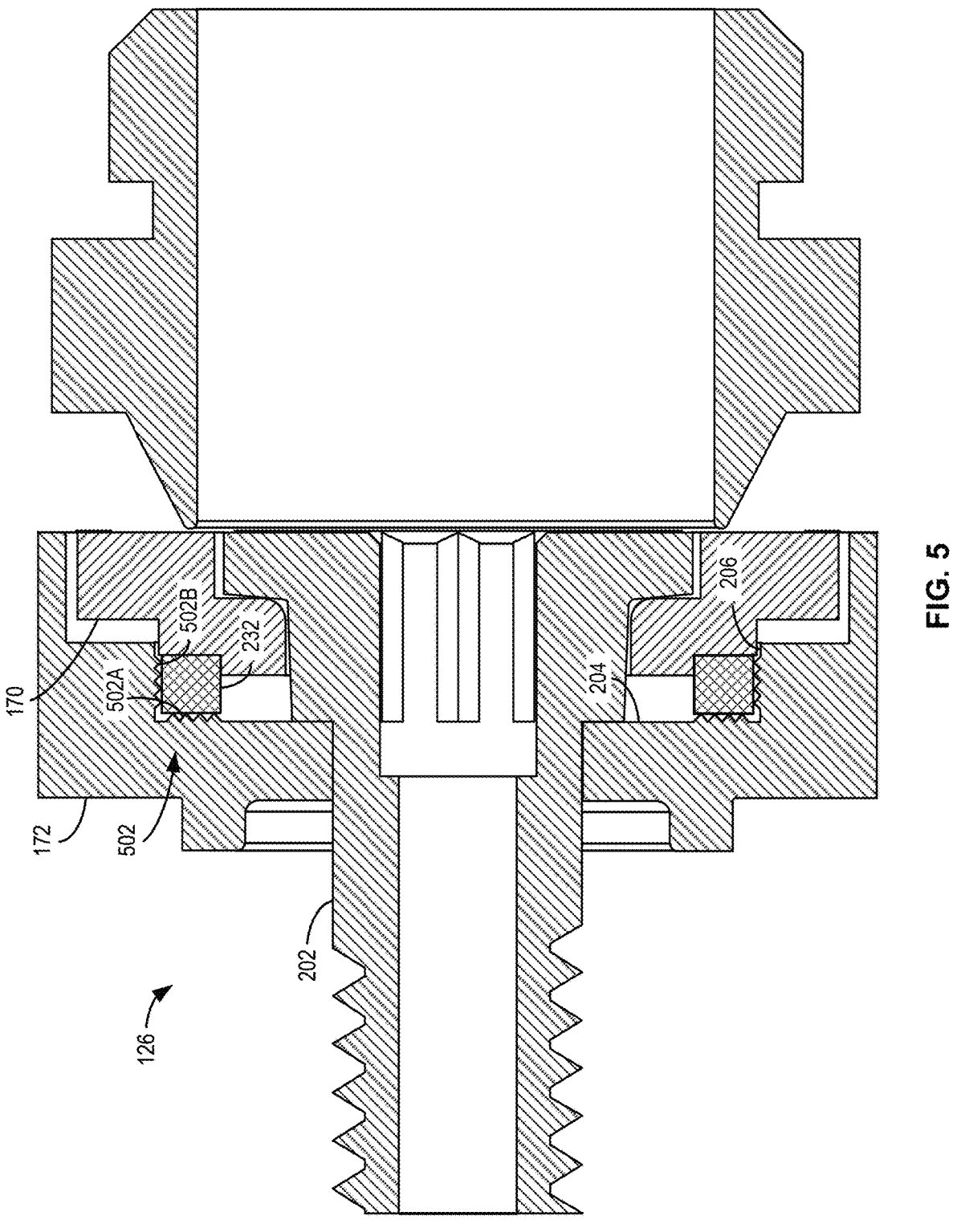
FIG. 5 is a cross-sectional view of the example valve disk assembly of FIGS. 1, 2, 3, and/or 4 including example serrated surfaces.

FIG. 5 illustrates the example valve disk assembly 126 of FIGS. 1, 2, 3, and/or 4 including example serrated surfaces (e.g., roughened surfaces, textured surfaces) 502. For example, in FIG. 5, the first inner surface 204 of the disk holder 172 includes a first example serrated surface 502A, and the second inner surface 206 of the disk holder 172 includes a second example serrated surface 502B. In some examples, the first serrated surface 502A and/or the second serrated surface 502B sealably engage the alignment ring 232 to improve sealing performance of the alignment ring 232 (e.g., at an interface between the alignment ring 232 and the disk holder 172). In some examples, the valve disk assembly 126 can include one or more of the serrated surfaces 502 in addition to or instead of one(s) of the protrusions 402 of FIG. 4. While the serrated surfaces 502 are on the first and second inner surfaces 204, 206 of the disk holder 172 in this example, the serrated surfaces 502 can be on the alignment ring 232 in some examples (e.g., in addition to or instead of the disk holder 172). In some examples, at least one of the first serrated surface 502A or the second serrated surface 502B may be omitted (e.g., the first inner surface 204 and/or the second inner surface 206 can be substantially smooth). In some examples, the serrated surfaces 502A, 502B can extend continuously around a circumference of the retainer 202 along the respective inner surfaces 204, 206. In some examples, the serrated surfaces 502A, 502B correspond to multiple (e.g., disparate, discontinuous) areas of the respective inner surfaces 204, 206 of the disk holder 172.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

From the foregoing, it will be appreciated that example systems, apparatus, articles of manufacture, and methods have been disclosed that enable pivoting and/or rotation of an example disk relative to an example disk holder of an example valve disk assembly of an example pressure regulator. As a result, examples disclosed herein can compensate for possible misalignment between a seat of the pressure regulator and a stem rigidly coupled to the disk holder, thereby enabling the disk to sealably engage the seat without necessitating tilt of the stem and/or excessive build-up pressures when the disk contacts the seat. Further, examples disclosed herein include an example alignment ring between the disk and the disk holder to provide a seal between the disk and disk holder and/or to bias the disk to a neutral (e.g., undeflected) position. Additionally, examples disclosed herein provide a flow path (e.g., a through-hole, a cavity) through the valve disk assembly that enables sensing of pressure from an orifice of the seat while facilitating maintenance activities for the pressure regulator. For example, examples disclosed herein implement one or more angled (e.g., hex-shaped) features to facilitate installation and/or removal of the valve disk assembly (and/or one or more components thereof) from the stem. Disclosed systems, apparatus, articles of manufacture, and methods are accordingly directed to one or more improvement(s) in the operation of a machine or other electronic and/or mechanical device.

Example pressure regulators with pivotable valve disk assemblies are disclosed herein. Further examples and combinations thereof include the following:

Example 1 includes a pressure regulator comprising a valve body defining a fluid passageway between an inlet and an outlet, a seat positioned in the fluid passageway, a stem movable relative to the seat, and a disk assembly coupled to the stem, the disk assembly including a disk holder, an inner surface of the disk holder defining a cavity, a disk positioned in the cavity, the disk pivotable with respect to the disk holder to sealably engage the seat, and an alignment ring positioned between the inner surface and the disk, the alignment ring to provide a seal between the disk and the disk holder, the disk to compress the alignment ring when the disk pivots from a neutral position with respect to the disk holder, the alignment ring to bias the disk to the neutral position.

Example 2 includes the pressure regulator of example 1, wherein the inner surface includes an annular surface and a sidewall surface, the sidewall surface angled with respect to the annular surface, the alignment ring to sealably engage the annular surface and the sidewall surface.

Example 3 includes the pressure regulator of example 2, further including a protrusion extending from at least one of the annular surface or the sidewall surface, the protrusion to sealably engage with the alignment ring.

Example 4 includes the pressure regulator of example 2, wherein at least one of the annular surface or the sidewall surface is serrated.

Example 5 includes the pressure regulator of example 1, further including an adhesive layer coupled between the alignment ring and the disk.

Example 6 includes the pressure regulator of example 1, further including a retainer positioned in the cavity, the disk extending circumferentially around the retainer, the retainer including a first angled surface, the disk including a second angled surface complementary to the first angled surface, the first and second angled surfaces to define a threshold pivot angle between the disk and the disk holder.

Example 7 includes the pressure regulator of example 6, wherein the threshold pivot angle is less than or equal to approximately 3 degrees.

Example 8 includes the pressure regulator of example 6, wherein the retainer includes a hex-shaped feature to facilitate removal of the disk assembly from the stem.

Example 9 includes the pressure regulator of example 1, wherein the alignment ring is integrally formed with the disk holder.

Example 10 includes the pressure regulator of example 1, wherein the alignment ring has a square cross-sectional shape.

Example 11 includes the pressure regulator of example 1, wherein the disk includes nylon and the alignment ring includes an elastomeric material.

Example 12 includes a valve disk assembly for a pressure regulator, the valve disk assembly comprising a disk holder, an inner surface of the disk holder defining a cavity, a disk positioned in the cavity, the disk pivotable with respect to the disk holder, and an alignment ring positioned between the inner surface and the disk, the alignment ring to provide a seal between the disk and the disk holder, the disk to compress the alignment ring when the disk pivots from a neutral position with respect to the disk holder, the alignment ring to bias the disk to the neutral position.

Example 13 includes the valve disk assembly of example 12, wherein the inner surface includes an annular surface and a sidewall surface, the sidewall surface angled with respect to the annular surface, the alignment ring to sealably engage the annular surface and the sidewall surface.

Example 14 includes the valve disk assembly of example 13, further including a protrusion extending from at least one of the annular surface or the sidewall surface, the protrusion to sealably engage with the alignment ring.

Example 15 includes the valve disk assembly of example 13, wherein at least one of the annular surface or the sidewall surface is serrated.

Example 16 includes the valve disk assembly of example 12, further including an adhesive layer coupled between the alignment ring and the disk.

Example 17 includes a valve disk assembly for a pressure regulator, the valve disk assembly comprising a disk holder, a disk positioned in the disk holder, the disk pivotable from a neutral position with respect to the disk holder, and an O-ring positioned between the disk and the disk holder, the O-ring to bias the disk to the neutral position.

Example 18 includes the valve disk assembly of example 17, wherein the O-ring is sealably coupled between the disk and the disk holder.

Example 19 includes the valve disk assembly of example 17, wherein the O-ring is positioned between the disk and a protruding surface of the disk holder.

Example 20 includes the valve disk assembly of example 17, wherein the O-ring is positioned between the disk and a serrated surface of the disk holder.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A pressure regulator comprising:

a valve body defining a fluid passageway between an inlet and an outlet;

a seat positioned in the fluid passageway;

a stem movable relative to the seat; and a disk assembly coupled to the stem, the disk assembly including:

a disk holder, an inner surface of the disk holder defining a cavity;

a disk positioned in the cavity, the disk pivotable with respect to the disk holder to sealably engage the seat;

an alignment ring positioned between the inner surface and the disk, the alignment ring to provide a seal between the disk and the disk holder, the disk to compress the alignment ring when the disk pivots from a neutral position with respect to the disk holder, the alignment ring to bias the disk to the neutral position; and a retainer positioned in the cavity, the disk extending circumferentially around the retainer, a first angled surface of the disk pivotable with respect to a second angled surface of the retainer.

2. The pressure regulator of claim 1, wherein the inner surface includes an annular surface and a sidewall surface, the sidewall surface angled with respect to the annular surface, the alignment ring to sealably engage the annular surface and the sidewall surface.

3. The pressure regulator of claim 2, further including a protrusion extending from at least one of the annular surface or the sidewall surface, the protrusion to sealably engage with the alignment ring.

4. The pressure regulator of claim 2, wherein at least one of the annular surface or the sidewall surface is serrated.

5. The pressure regulator of claim 1, further including an adhesive layer coupled between the alignment ring and the disk.

6. The pressure regulator of claim 1, wherein the first and second angled surfaces define a threshold pivot angle between the disk and the disk holder.

7. The pressure regulator of claim 6, wherein the threshold pivot angle is less than or equal to approximately 3 degrees.

8. The pressure regulator of claim 1, wherein the retainer includes a hex-shaped feature to facilitate removal of the disk assembly from the stem.

9. The pressure regulator of claim 1, wherein the alignment ring is integrally formed with the disk holder.

10. The pressure regulator of claim 1, wherein the alignment ring has a square cross-sectional shape.

11. The pressure regulator of claim 1, wherein the disk includes nylon and the alignment ring includes an elastomeric material.

12. A valve disk assembly for a pressure regulator, the valve disk assembly comprising:

a disk holder, an inner surface of the disk holder defining a cavity;

a disk positioned in the cavity, the disk pivotable with respect to the disk holder;

an alignment ring positioned between the inner surface and the disk, the alignment ring to provide a seal between the disk and the disk holder, the disk to compress the alignment ring when the disk pivots from a neutral position with respect to the disk holder, the alignment ring to bias the disk to the neutral position; and a retainer positioned in the cavity, the disk extending circumferentially around the retainer, a first angled surface of the disk pivotable with respect to a second angled surface of the retainer.

13. The valve disk assembly of claim 12, wherein the inner surface includes an annular surface and a sidewall surface, the sidewall surface angled with respect to the annular surface, the alignment ring to sealably engage the annular surface and the sidewall surface.

14. The valve disk assembly of claim 13, further including a protrusion extending from at least one of the annular surface or the sidewall surface, the protrusion to sealably engage with the alignment ring.

15. The valve disk assembly of claim 13, wherein at least one of the annular surface or the sidewall surface is serrated.

16. The valve disk assembly of claim 12, further including an adhesive layer coupled between the alignment ring and the disk.

17. A valve disk assembly for a pressure regulator, the valve disk assembly comprising:

a disk holder;

a disk positioned in the disk holder, the disk pivotable from a neutral position with respect to the disk holder;

an O-ring positioned between the disk and the disk holder, the O-ring to bias the disk to the neutral position; and a retainer positioned in a cavity of the disk holder, the disk extending circumferentially around the retainer, a first angled surface of the disk pivotable with respect to a second angled surface of the retainer.

18. The valve disk assembly of claim 17, wherein the O-ring is sealably coupled between the disk and the disk holder.

19. The valve disk assembly of claim 17, wherein the O-ring is positioned between the disk and a protruding surface of the disk holder.

20. The valve disk assembly of claim 17, wherein the O-ring is positioned between the disk and a serrated surface of the disk holder.

* * * * *